United States Patent
Yang et al.

(10) Patent No.: US 9,747,076 B1
(45) Date of Patent: Aug. 29, 2017

(54) PARALLEL PSEUDO RANDOM BIT SEQUENCE GENERATION WITH ADJUSTABLE WIDTH

(71) Applicant: Altera Corporation, San Jose, CA (US)

(72) Inventors: Haiyun Yang, San Jose, CA (US); Tianshu Chi, San Jose, CA (US)

(73) Assignee: Altera Corporation, San Jose, CA (US)

( * ) Notice: Subject to any disclaimer, the term of this patent is extended or adjusted under 35 U.S.C. 154(b) by 270 days.

(21) Appl. No.: 14/561,131

(22) Filed: Dec. 4, 2014

(51) Int. Cl.
*G06F 7/58* (2006.01)

(52) U.S. Cl.
CPC .................. *G06F 7/584* (2013.01)

(58) Field of Classification Search
CPC .................. G06F 7/58; G06F 7/584
See application file for complete search history.

(56) References Cited

U.S. PATENT DOCUMENTS

| | | | |
|---|---|---|---|
| 3,746,847 A | 7/1973 | Maritas | |
| 4,213,101 A | 7/1980 | Policand et al. | |
| 5,268,949 A | 12/1993 | Watanabe et al. | |
| 5,434,807 A * | 7/1995 | Yoshida | G06F 7/584 708/253 |
| 6,188,714 B1 | 2/2001 | Yamaguchi | |
| 6,339,781 B1 * | 1/2002 | Sasaki | G06F 7/584 708/250 |
| 6,765,506 B1 * | 7/2004 | Lu | H04J 13/10 341/50 |
| 7,124,158 B2 | 10/2006 | Ruthstein | |
| 7,512,645 B2 * | 3/2009 | Pitz | G06F 7/584 708/250 |
| 2005/0207207 A1 * | 9/2005 | Gammel | G06F 7/584 365/149 |
| 2010/0287224 A1 | 11/2010 | Yan | |
| 2013/0055039 A1 | 2/2013 | Gearth | |
| 2013/0262543 A1 * | 10/2013 | Abdoo | G06F 7/58 708/250 |

OTHER PUBLICATIONS

A. Lempel et al., "A class of balanced binary sequences with optimal autocorrelation properties", IEEE Transactions on Information Theory, vol. IT-23, Nov. 1, Jan. 1977, pp. 38-42.

* cited by examiner

*Primary Examiner* — Chuong D Ngo
(74) *Attorney, Agent, or Firm* — Treyz Law Group, P.C.; Jason Tsai

(57) ABSTRACT

Integrated circuits with pseudo random bit sequence (PRBS) generation circuitry are provided. The PRBS generation circuitry may be configured to support parallel output generation in multiple modes, where the parallel bit width in each mode can be different. The PRBS generation circuitry may include a linear feedback shift register that implements a desired polynomial, one or more XOR tree circuits that produces the parallel output bits, a multiplexer for selectively routing a subset of the parallel output bits back to the input of the shift register, and a gearbox for performing an adjustable bit width conversion. Configured in this way, the PRBS generation circuitry can provide parallel PRBS generation with an adjustable bit width.

18 Claims, 8 Drawing Sheets

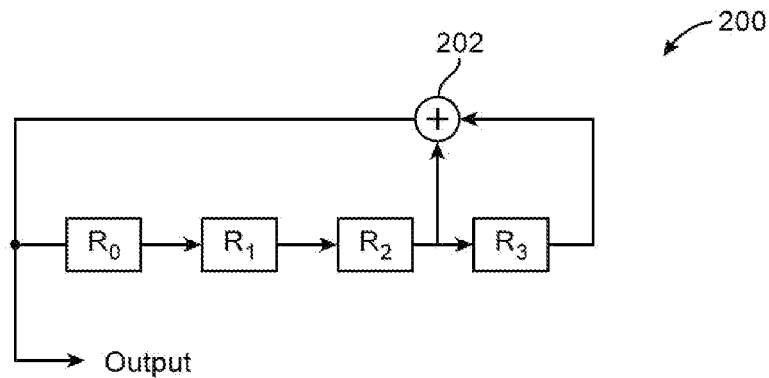

FIG. 2

| Shift | R0 | R1 | R2 | R3 | Output |
|---|---|---|---|---|---|
| 1-bit | $d_2\char`\^d_3$ | $d_0$ | $d_1$ | $d_2$ | $a[9]=d_2\char`\^d_3$ |
| 2-bit | $d_1\char`\^d_2$ | $d_2\char`\^d_3$ | $d_0$ | $d_1$ | $a[8]=d_1\char`\^d_2$ |
| 3-bit | $d_0\char`\^d_1$ | $d_1\char`\^d_2$ | $d_2\char`\^d_3$ | $d_0$ | $a[7]=d_0\char`\^d_1$ |
| 4-bit | $d_0\char`\^d_2\char`\^d_3$ | $d_0\char`\^d_1$ | $d_1\char`\^d_2$ | $d_2\char`\^d_3$ | $a[6]=d_0\char`\^d_2\char`\^d_3$ |
| ⋮ | ⋮ | ⋮ | | | |
| 8-bit | $d_0\char`\^d_1\char`\^d_2$ | $d_1\char`\^d_2\char`\^d_3$ | $d_0\char`\^d_2$ | $d_1\char`\^d_3$ | $a[2]=d_0\char`\^d_1\char`\^d_2$ |
| 9-bit | $d_0\char`\^d_1\char`\^d_2\char`\^d_3$ | $d_0\char`\^d_1\char`\^d_2$ | $d_1\char`\^d_2\char`\^d_3$ | $d_0\char`\^d_2$ | $a[1]=d_0\char`\^d_1\char`\^d_2\char`\^d_3$ |
| 10-bit | $d_0\char`\^d_1\char`\^d_3$ | $d_0\char`\^d_1\char`\^d_2\char`\^d_3$ | $d_0\char`\^d_1\char`\^d_2$ | $d_1\char`\^d_2\char`\^d_3$ | $a[0]=d_0\char`\^d_1\char`\^d_3$ |

FIG. 3

| Shift | R0 | R1 | R2 | R3 | Output |
|---|---|---|---|---|---|
| 1-bit | $d_2 \wedge d_3$ | $d_0$ | $d_1$ | $d_2$ | $b[63] = d_2 \wedge d_3$ |
| 2-bit | $d_1 \wedge d_2$ | $d_2 \wedge d_3$ | $d_0$ | $d_1$ | $b[62] = d_1 \wedge d_2$ |
| ... | | | | | ... |
| 9-bit | $d_0 \wedge d_1 \wedge d_2 \wedge d_3$ | $d_0 \wedge d_1 \wedge d_2$ | $d_1 \wedge d_2 \wedge d_3$ | $d_0 \wedge d_2$ | $b[55] = d_0 \wedge d_1 \wedge d_2 \wedge d_3$ |
| 10-bit | $d_0 \wedge d_1 \wedge d_3$ | $d_0 \wedge d_1 \wedge d_2 \wedge d_3$ | $d_0 \wedge d_1 \wedge d_2$ | $d_1 \wedge d_2 \wedge d_3$ | $b[54] = d_0 \wedge d_1 \wedge d_3$ |
| ... | | | | | ... |
| 63-bit | $d_0 \wedge d_1$ | $d_1 \wedge d_2$ | $d_2 \wedge d_3$ | $d_0$ | $b[1] = d_0 \wedge d_1$ |
| 64-bit | $d_0 \wedge d_2 \wedge d_3$ | $d_0 \wedge d_1$ | $d_1 \wedge d_2$ | $d_2 \wedge d_3$ | $b[0] = d_0 \wedge d_2 \wedge d_3$ |

FIG. 7

PARALLEL PSEUDO RANDOM BIT SEQUENCE GENERATION WITH ADJUSTABLE WIDTH

BACKGROUND

This relates to integrated circuits such as programmable integrated circuits, and more particularly, to integrated circuits with pseudo random bit sequence (PRBS) generators.

Integrated circuits often include circuitry for supporting pseudo random bit sequence (PRBS) generation for use in a wide variety of applications. The PRBS generation is typically based on a predetermined generation polynomial. The PRBS generation polynomial is often implemented using a linear feedback shift register (LFSR). The linear feedback shift register is capable of generating one bit per clock cycle. This type of PRBS generation is sometimes referred to as serial PRBS generation.

In order to achieve higher data rates, it may be necessary to generate more than one bit per clock cycle. Circuitry for generating multiple PRBS bits in parallel (sometimes referred to as parallel PRBS generation) has been developed. Consider an example of a conventional $4^{th}$ order PRBS generator that generates 10 output bits in parallel. In this example, the PRBS generator includes a linear feedback shift register that provides four outputs and a logic exclusive OR (XOR) tree that receives the four outputs directly from the linear feedback shift register and that generates a 10-bit parallel output. Four of the least significant bits in the 10-bit parallel output are then directly fed back to the linear feedback shift register for the next cycle.

Such types of parallel PRBS generator, however, are still only capable of generating a fixed width parallel output. In programmable integrated circuits that can be used to support a wide variety of applications, however, parallel PRBS generators having fixed bit widths limit the number of applications that can be supported.

SUMMARY

Integrated circuits with pseudo random bit sequence (PRBS) generation circuitry are provided. The PRBS generation circuitry may generally include a linear feedback shift register configured to implement some predetermined polynomial, a tree circuit (e.g., a tree of XOR gates) configured to output multiple PRBS bits in parallel, and associated control circuitry that is coupled to the linear feedback shift register and the tree circuit. The control circuitry may serve to place the PRBS generation circuitry in a first mode during which the PRBS generation circuitry outputs a first number of parallel bits and in a second mode during which the PRBS generation circuitry outputs a second number of parallel bits that is different than the first number.

In one suitable arrangement, the control circuitry may include a multiplexing circuit having a first input that receives a first subset of the plurality of parallel bits from the tree circuit, a second input that receives a second subset of the plurality of parallel bits from the tree circuit (where the first and second subsets do not overlap), and an output that is coupled to the linear feedback shift register via a feedback path. The control circuitry may also include a gearbox circuit that is configured to provide only binary bus width conversion (e.g., a data width conversion factor of 1, ½, ¼, ⅛, etc.) for the plurality of parallel bits received from the tree circuit and that outputs an update signal that enables shifting at the linear feedback shift register.

In another suitable arrangement, the control circuitry may include an adjustable data width conversion circuit that receives the parallel data bits from the tree circuit and that outputs a control signal for selectively enabling shifting at the linear feedback shift register. The adjustable data width conversion circuit may be configured to output a first number of parallel data bits in the first mode and to output a second number of parallel data bits in the second mode (where the second number is different than the first number). In this arrangement, the PRBS generation circuitry may also include an additional tree circuit. In such scenarios, the control circuitry may also include a multiplexing circuit having a first input that is coupled to the tree circuit, a second input that is coupled to the additional tree circuit, and an output that is coupled to the adjustable data width conversion circuit. A bit padding circuit may also be interposed between the additional tree circuit and the multiplexing circuit. The control circuitry may also include another multiplexing circuit having a first input that receives only a subset of bits from the tree circuit, a second input that receives only a subset of bits from the additional tree circuit, and an output that is coupled to the linear feedback shift register.

Further features of the invention, its nature and various advantages will be more apparent from the accompanying drawings and the following detailed description of the preferred embodiments.

BRIEF DESCRIPTION OF THE DRAWINGS

FIG. 2 is a diagram of an illustrative linear feedback shift register in accordance with an embodiment.

FIG. 3 is a table showing $4^{th}$ order pseudo random bit sequence (PRBS) generation with a 10-bit parallel output in accordance with an embodiment.

FIG. 7 is a diagram showing how a 64-bit parallel PRBS output includes the 10-bit parallel PRBS output in accordance with an embodiment.

DETAILED DESCRIPTION

This relates to integrated circuits and more particularly, to circuitry for generating pseudo random bit sequences (PRBS) on programmable integrated circuits.

Programmable integrated circuits such as programmable logic device integrated circuits use programmable memory elements to store configuration data. During the programming of a programmable integrated circuit, configuration data is loaded into the memory elements. During operation of the programmable integrated circuit, each memory element provides a static output signal. The static output signals that are supplied by the memory elements serve as control signals. These control signals are applied to programmable logic on the integrated circuit to customize the programmable logic to perform a desired logic function.

Memory elements may be organized in arrays having numerous rows and columns. For example, memory array circuitry may be formed in hundreds or thousands of rows and columns on a programmable logic device integrated circuit. Programmable integrated circuit 10 of FIG. 1 is an example of an illustrative integrated circuit on which memory array circuitry may be formed.

Figure 1:
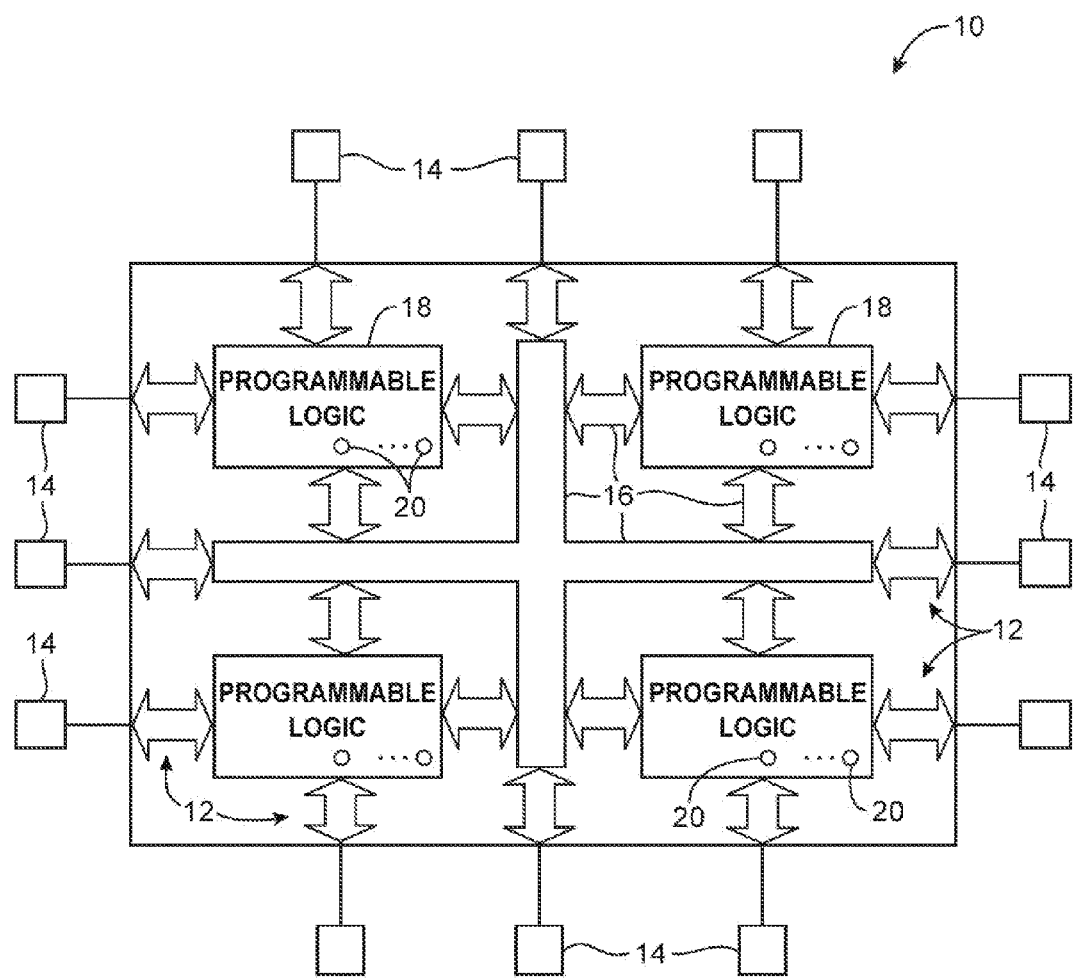
FIG. 1 is a diagram of an illustrative integrated circuit with an array of memory cells such as a programmable integrated circuit in accordance with an embodiment.

As shown in FIG. 1, programmable integrated circuit 10 may have input/output circuitry 12 for driving signals off of device 10 and for receiving signals from other devices via input-output pins 14. Interconnection resources 16 such as global and local vertical and horizontal conductive lines and buses may be used to route signals on device 10. Interconnection resources 16 include fixed interconnects (conductive lines) and programmable interconnects (i.e., programmable connections between respective fixed interconnects). Programmable logic 18 may include combinational and sequential logic circuitry. The programmable logic 18 may be configured to perform a custom logic function.

Programmable integrated circuit 10 contains memory elements 20 that can be loaded with configuration data (also called programming data) using pins 14 and input/output circuitry 12. Once loaded, the memory elements each provide a corresponding static control output signal that controls the state of an associated logic component in programmable logic 18. Typically the memory element output signals are used to control the gates of metal-oxide-semiconductor (MOS) transistors. Some of the transistors may be p-channel metal-oxide-semiconductor (PMOS) transistors. Many of these transistors may be n-channel metal-oxide-semiconductor (NMOS) pass transistors in programmable components such as multiplexers. When a memory element output is high, an NMOS pass transistor controlled by that memory element will be turned on to pass logic signals from its input to its output. When the memory element output is low, the pass transistor is turned off and does not pass logic signals.

Programmable integrated circuit 10 of this type may therefore be configured using different patterns of configuration data to implement a variety of custom logic functions. In general, programmable device 10 may be used to support a wide variety of applications. In accordance with an embodiment, device 10 may be provided with pseudo random bit sequence (PRBS) generation circuitry. The PRBS generation circuitry may be used to generate a pseudo random binary sequence that is based on some predetermined polynomial function. For example, a $7^{th}$ order PRBS polynomial may be defined by an expression "$x^7+x^6+1$" and may generate a sequence that is sometimes referred to as a PRBS-7 sequence. As another example, a $15^{th}$ order PRBS polynomial may be defined by an expression "$x^{15}+x^{13}+1$" and may generate a sequence that can be referred to as a PRBS-15 sequence. As yet another example, a $31^{st}$ order PRBS polynomial may be defined by an expression "$x^{31}+x^{18}+1$" and may generate a sequence that can be referred to as a PRBS-31 sequence.

Pseudo random bit sequence generators are often implemented using linear feedback shift registers. FIG. 2 shows an example of a $4^{th}$ order linear feedback shift register (LFSR) 200. As shown in FIG. 2, shift register 200 may include a first register R0, a second register R1, a third register R2, and a fourth register R3 coupled in series and a logic exclusive OR (XOR) circuit 202 having a first input coupled to an output of register R2, a second input coupled to an output of register R3, and an output that is fed back to an input of register R0. Arranged in this way, register 200 implements the $4^{th}$ order PRBS generation polynomial "$x^4+x^3+1$." In the example of FIG. 2, the output of XOR gate 202 serves as an output port for register 200. In serial PRBS generation, register 200 may provide one bit of output per clock cycle. At each successive clock cycle, register 200 performs a single shift operation and generates one new data bit at the output port.

In order to achieve higher data rates, it may be necessary for PRBS generation circuitry to generate multiple output bits during each clock cycle (i.e., to generate multiple bits in parallel). This type of PRBS generation is therefore sometimes referred to as parallel PRBS generation. FIG. 3 is a table showing the parallel generation of 10 bits based on the exemplary linear feedback shift register 200 of FIG. 2. Assume that data bits d0, d1, d2, and d3 are initially loaded into registers R0, R1, R2, and R3, respectively.

After a 1-bit shift, bits d0-d2 are shifted into registers R1-R3, respectively, whereas XOR gate 202 produces a result d2^d3 (i.e., the XOR of d2 and d3) that is loaded into register R0. The symbol ^ is used to indicate the XOR function. The output of XOR gate 202 after the first shift may also represent parallel output bit a[9] (e.g., a[9] is equal to d2^d3).

The a[8] output bit may be produced after another 1-bit shift. As shown in FIG. 3, the a[8] output is equal to the XOR of the data bits previously stored in registers R2 and R3 (e.g., data bits d1 and d2 were previously stored in R2 and R3, so a[8] is equal to d1^d2). Similarly, the a[7] output bit may be produced after yet another 1-bit shift. The a[7] output is also equal to the XOR of the data bits previously stored in registers R2 and R3 (e.g., data bits d0 and d1 were previously stored in R2 and R3, so a[7] is equal to d0^d1). The remaining eight bits of the 10-bit parallel output may be computed in a similar fashion. In this example, a[2] may be equal to d0^d1^d2; a[1] may be equal to d0^d1^d2^d3; and a[0] may be equal to d0^d1^d3. These results are based on the logical simplification where dx^dy^dy^dz is equivalent to dx^dz (i.e., a value XOR'ed by itself can be eliminated from the final expression).

Figure 4:
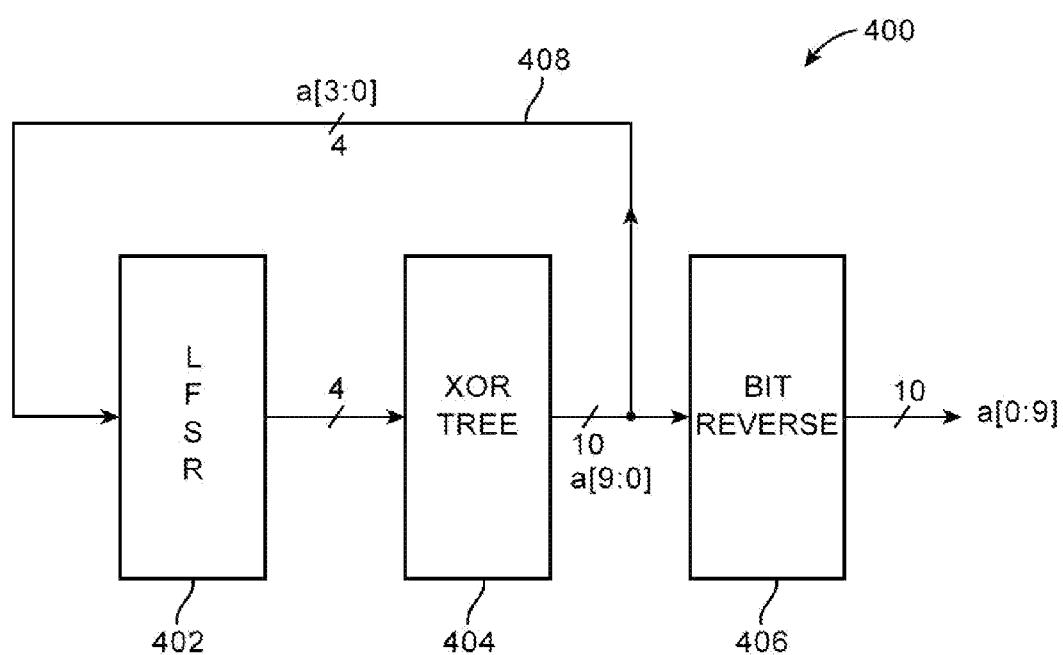
FIG. 4 is a diagram of circuitry that can be used to implement the $4^{th}$ order 10-bit parallel PRBS generation of FIG. 3.

As shown in the example of FIG. 3, each of the 10 parallel output bits a[9:0] may be computed as a function of some or all of the data bits initially loaded into the linear feedback shift register (e.g., bits a[9:0] can all be calculated from some combination of d0, d1, d2, and d3). Based on this observation, the parallel generation for a given polynomial can therefore be implemented using a tree of XOR gates (sometimes referred to as an XOR tree). The XOR tree may generally be constructed based on the PRBS generation polynomial and the number of bits that have to be generated in parallel. FIG. 4 is a diagram of circuitry 400 that can be used to implement the $4^{th}$ order 10-bit parallel PRBS generation of FIG. 3. As shown in FIG. 4, circuitry 400 may include a linear feedback shift register 402 (e.g., a $4^{th}$ order linear feedback shift register of the type shown in FIG. 2), an XOR tree 404, and a bit reverse circuit 406.

In a first clock cycle, register 402 may output four initial data bits d0-d3 to XOR tree 404. XOR tree 404 may include a network of XOR gates interconnected to implement respective XOR functions for each of the 10 parallel output bits a[9:0] described in connection with FIG. 3. Four of the ten bits (i.e., a[3:0]) may be fed back to the input of register 402 for the next clock cycle. In most communications standards such as the IEEE 802.3 Ethernet protocol, the first output bit is mapped to the least significant bit (LSB), so bit-reverse module 406 may be used to reverse the order of bits for the output of circuitry 400. Bit-reverse module 406 may be protocol-dependent and can sometimes be bypassed and need not always be used.

The PRBS generation circuitry 400 exhibits a fixed parallel bit width (i.e., circuitry 400 can only support a 10-bit parallel output generation). As described above, programmable integrated circuits are often used to support many different applications each of which can have different bus width requirements. For example, it may be desirable for a programmable integrated circuit to be able to support at least 10-bit, 16-bit, 20-bit, 32-bit, 40-bit, and 64-bit parallel PRBS generation.

One way of supporting multiple bit widths is via a direct implementation where multiple versions of circuitry 400 are instantiated (i.e., each instantiation providing a different XOR tree corresponding to the desired bit width), and selectively switching only one of the multiple versions of circuitry 400 into use. This brute force approach, although functional, is inefficient since a large portion of PRBS generation circuitry will be idle and taking up valuable die area on the integrated circuit. It would therefore be desirable to provide a more efficient way of implementing parallel PRBS generation with adjustable width.

Embodiments of the present invention are based upon at least two key observations: (1) for a given polynomial, the PRBS is always the same, and the different widths only impact the size of XOR tree that is required; and (2) when a maximum width (say 64-bit parallel output) is generated, all other narrower widths (say 8, 16, and 32-bit parallel outputs) are already generated during the process of generating all 64 parallel outputs.

Figure 5:
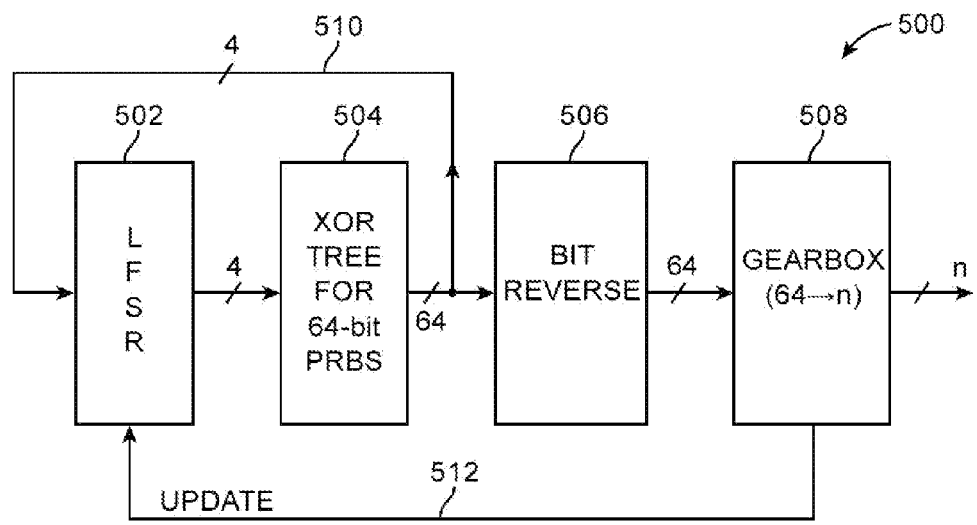
FIG. 5 is a diagram of illustrative PRBS generation circuitry that includes a gearbox for providing different parallel bit widths in accordance with an embodiment.

FIG. 5 shows one suitable arrangement of PRBS generation circuitry that takes advantage of these observations. As shown in FIG. 5, PRBS generation circuitry 500 may include a linear feedback shift register 502, an XOR tree 504, a bit reverse module 506, and a gearbox module 508. In the example of FIG. 5, PRBS generation circuitry 500 may implement a $4^{th}$ order PRBS generation that supports up to 64-bit parallel output generation. Register 502 may therefore provide a 4-bit output to an XOR tree 504 that is configured to generate all 64-bit parallel outputs in one clock cycle. A subset of the 64 output bits (i.e., the four least significant bits) can then be fed back to the input of register 502 via path 510 for generating PRBS bits in the next clock cycle.

The 64-bit output from XOR tree 504 may optionally be fed through bit reverse module 506 to reverse the order of the parallel bits. The reversed 64-bit parallel output may then be fed into gearbox 508. In accordance with an embodiment, gearbox 508 may serve to convert the 64-bit word to an output with the desired bit width. Gearbox 508 may rely on use of different clock signals at the input and output ports to convert the width at the input to an adjustable width at the output (e.g., gearbox 508 may latch data at its input at a first clock rate and may output data at its output at a second adjustable clock rate that is less than the first clock rate). Gearbox 508 of this type can sometimes be referred to as an adjustable bus-width converting circuit.

For example, gearbox 508 may convert the 64-bit output to an n-bit output, where n can be equal to 8, 10, 16, 20, 32, 40, and 64 (as examples). In the example where n is equal to 16, four 16-bit parallel outputs may be serially outputted from gearbox 508 before the next shift at register 502. When n is less than 64, the linear feedback shift register 502 need not shift every clock cycle. Register 502 should only shift when gearbox 508 feeds an asserted update signal to register 502 via control path 512. For the example above where n is equal to 16, the update signal is asserted once per four clock cycles. As another example, when n is equal to 32, the update signal is asserted once every two clock cycles. As yet another example, when n is equal to eight, the update signal is asserted once every eight clock cycles.

The order of the polynomial and the 64-bit max bit width supported by circuitry 500 of FIG. 5 are merely illustrative and do not serve to limit the scope of the present invention. If desired, circuitry 500 may be configured to implement a PRBS polynomial of any suitable order (e.g., by reconfiguring register 502) and to support parallel generation of any number of bits (e.g., by reconfiguring the XOR tree 504).

For cases where n is a factor of 64, gearbox 508 is relatively simple to implement. For cases in which gearbox 508 has to also support conversion to n that is not a factor of 64, the implementation of gearbox 508 can be fairly complex. In the example above where n can be set to any value among 8, 10, 16, 20, 32, 40, and 64, one can observe that all the widths are either a factor of 40 or 64. Therefore, if a PRBS generator can include both 40-bit and 64-bit XOR trees, all of the n values can be implemented without a complex gearbox.

Figure 6:
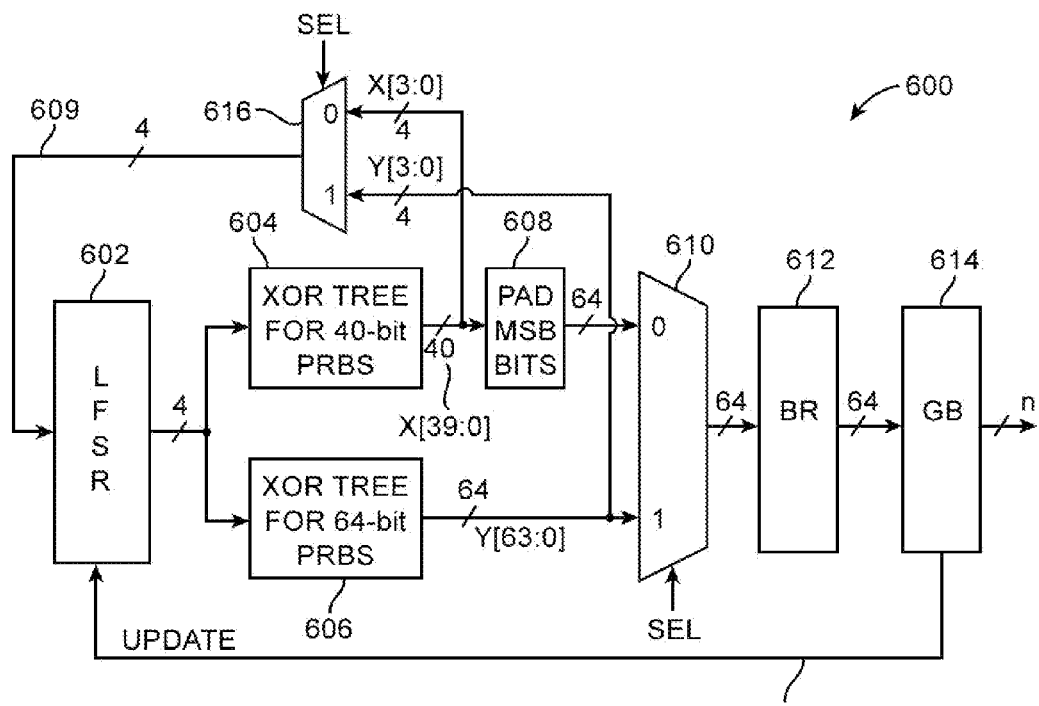
FIG. 6 is a diagram of illustrative PRBS generation circuitry that includes multiple exclusive OR (XOR) trees for providing different parallel bit widths in accordance with an embodiment.

FIG. 6 shows another suitable arrangement of PRBS generation circuitry 600 that utilizes multiple XOR trees and a simple gearbox to support a variety of parallel bit widths. As shown in FIG. 6, PRBS generation circuitry 600 includes a $4^{th}$ order linear feedback shift register 602, a first XOR tree 604, a second XOR tree 606, a first multiplexing circuit 616 for selectively routing bits from either one of XOR trees 604 and 606 back to register 602 via feedback path 609, a second multiplexing circuit 610 for selectively passing parallel bits from one of XOR trees 604 and 606 to a gearbox circuit 614 via an optional bit reverse module 612.

Register 602 that implements a $4^{th}$ order polynomial may provide a 4-bit output to both XOR tree 604 and XOR tree 606. XOR tree 604 may serve to output a 40-bit parallel output X[39:0] based on the provided input, whereas XOR tree 606 may serve to output a 64-bit parallel output Y[63:0] based on the provided input. Multiplexer 616 may have a first (0) input that receives a subset X[3:0] from the output of first XOR tree 604, a second (1) input that receives a subset Y[3:0] from the output of second XOR tree 606, a control input that receives control signal SEL, and an output on which bits from a selected one of the first and second inputs are routed. The output of multiplexer 616 can be fed back to the input of register 602 via feedback path 609.

The 40-bit parallel output from XOR tree 604 may be padded with most significant bits (MSB) using MSB padding circuit 608 to generate a padded 64-bit parallel output. Multiplexer 610 may have a first (0) input that receives the 64-bit padded data from XOR tree 604, a second (1) input that receives the 64-bit raw data directly from XOR tree 606, a control input that receives signal SEL, and an output that is coupled to gearbox (or bus converter) 614 via bit reverse module 612.

For example, gearbox 613 may be used to convert the 64-bit output to an n-bit output, where n can be equal to 8, 10, 16, 20, 32, 40, and 64. To support n of 10, 20, and 40 (i.e., for n that are equal to factors of 40), signal SEL may be set to logic "0" so that bits from XOR tree 604 are switched into use. To support n of 8, 16, 32, and 64 (i.e., for n that are equal to factors of 64), signal SEL may be set to logic "1" so that bits from XOR tree 606 are switched into use. Similar to the previous example of FIG. 5, register 605 of FIG. 6 should only shift when gearbox 614 feeds an asserted update signal to register 605 via control path 618. In either mode (i.e., whether SEL is low or high), gearbox 614 need only to implement a conversion of 1, ½, ¼, or ⅛, which results in a fairly simple gearbox (e.g., a simple gearbox is configured to provide only binary bus width conversion).

The $4^{th}$ order polynomial and the 40-bit/64-bit dual width supported by circuitry 600 of FIG. 6 are merely illustrative and do not serve to limit the scope of the present invention. If desired, circuitry 600 may be configured to implement a PRBS polynomial of any suitable order (e.g., by reconfiguring register 602) and to support parallel generation of any number of bits (e.g., by incorporating more than two XOR trees).

In another suitable embodiment, PRBS generation circuitry leverages the second key observation that (2) when a maximum width (say 64-bit parallel output) is generated, narrower widths (say 10-bit parallel output) are already generated during the process of generating all 64 parallel outputs and enables support of multiple bit widths without use of a gearbox. FIG. 7 is a table showing an illustrative 64-bit PRBS-4 generation. FIG. 7 shows the expression for each of the 64-bit parallel outputs b[63:0] as a function of initial bits d0, d1, d2, and d3 stored in a 4-bit linear feedback shift register having registers R0, R1, R2, and R3. Comparing the output expressions between FIGS. 3 and 7, one can see that the 64-bit parallel output already includes the 10-bit parallel output (i.e., expressions for b[9:0] in FIG. 3 are identical to the expressions for b[63:54] in FIG. 7).

Figure 8:
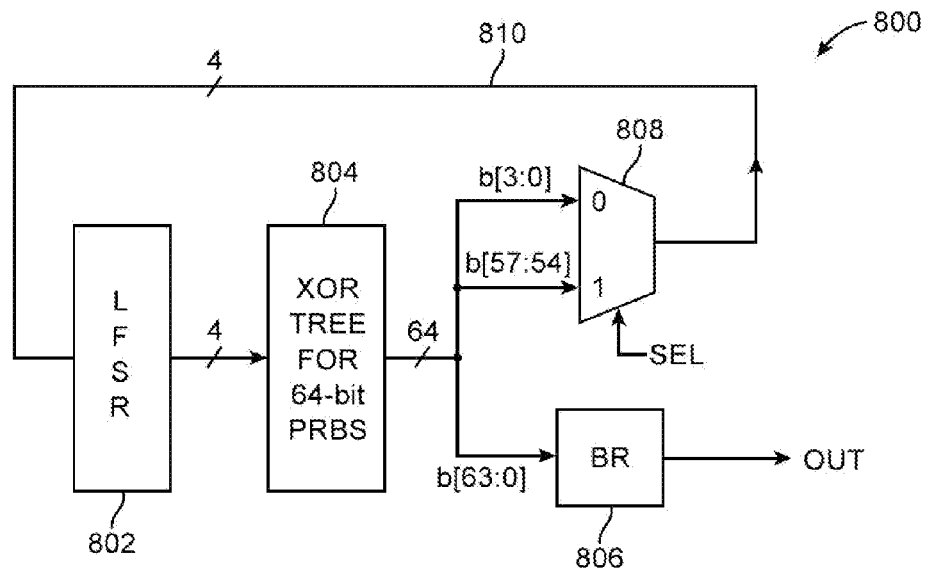
FIGS. 8 and 9 are diagrams of illustrative PRBS generation circuitry that includes an XOR tree and an associated multiplexing circuit for providing different parallel bit widths in accordance with an embodiment.

FIG. 8 shows PRBS generation circuitry 800 that is implemented based on the above observation. As shown in FIG. 8, circuitry 800 may include a $4^{th}$ order LFSR 802, an XOR tree 804 capable of generating a 64-bit parallel output, and a multiplexing circuit 808. The 64-bits at the output of XOR tree 804 may be fed to the output of circuitry 800 via an optional bit reverse module 806. Multiplexer 808 may have a first (0) input that receives bits b[3:0], a second (1) input that receives bits b[57:54], a control input that receives signal SEL, and an output on which bits from a selected one of its inputs can be routed. The output of multiplexer 808 may be fed to the input of LFSR 802 via feedback path 810. Configured in this way, circuitry 800 may be operated in a PRBS-4 64-bit parallel output mode when SEL is low and may be operated in a PRBS-4 10-bit parallel output mode when SEL is high.

Figure 9:
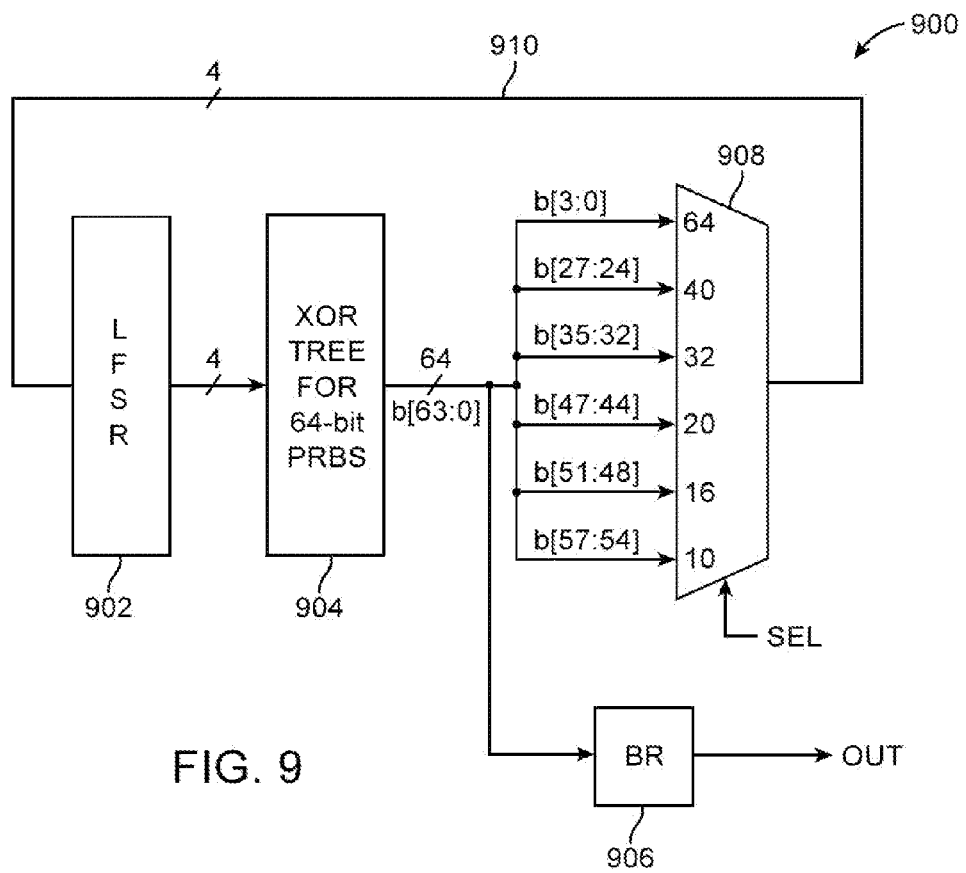

The implementation of FIG. 8 may be extended to other widths (see, e.g. FIG. 9). As shown in FIG. 9, PRBS generation circuitry 900 may include a $4^{th}$ order LFSR 902, an XOR tree 904 capable of generating a 64-bit parallel output, and a multiplexing circuit 908. The 64-bits at the output of XOR tree 904 may be fed to the output of circuitry 900 via an optional bit reverse module 906. Multiplexer 908 may have a first input that receives bits b[3:0], a second input that receives bits b[27:24], a third input that receives bits b[35:32], a fourth input that receives bits b[47:44], a fifth input that receives bits b[51:48], a sixth input that receives bits b[57:54], a control input that receives signal SEL, and an output on which bits from a selected one of its inputs can be routed. The output of multiplexer 908 may be fed to the input of LFSR 902 via feedback path 910.

Configured in this way, circuitry 900 may be operated in a PRBS-4 64-bit parallel output mode when SEL selects the first input for passing through to the multiplexer output, in a 40-bit parallel output mode when SEL selects the second input for passing through to the multiplexer output, in a 32-bit parallel output mode when SEL selects the third input for passing through to the multiplexer output, in a 20-bit parallel output mode when SEL selects the fourth input for passing through to the multiplexer output, in a 16-bit parallel output mode when SEL selects the fifth input for passing through to the multiplexer output, and in a 10-bit parallel output mode when SEL selects the sixth input for passing through to the multiplexer output.

The $4^{th}$ order polynomial and the multi-width capability offered by circuitry 800 of FIG. 8 and by circuitry 900 of FIG. 8 are merely illustrative and do not serve to limit the scope of the present invention. If desired, the multiplexing circuit associated with the single XOR tree (e.g., multiplexer 808 and 908) may be configured to support any desired number of bus widths without the use of a gearbox.

Figure 10:
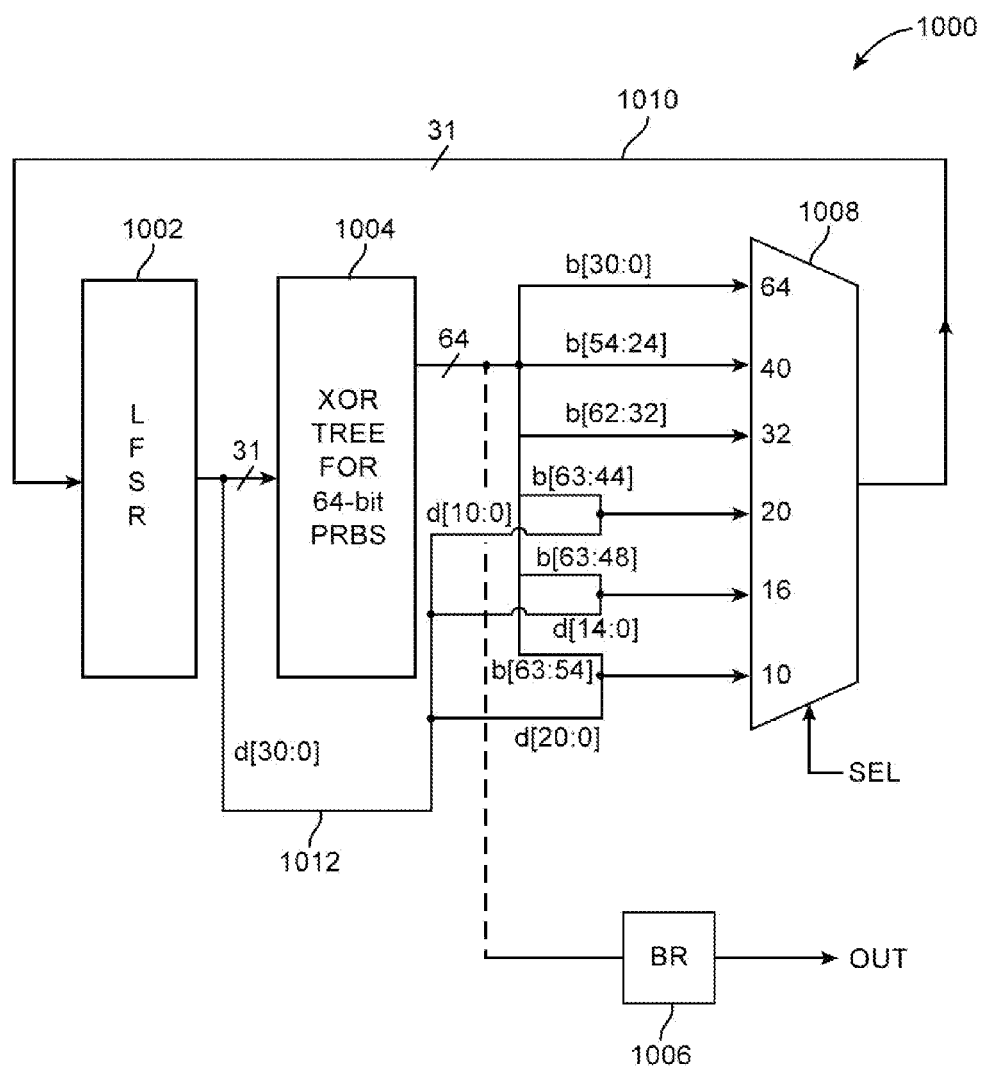
FIG. 10 is a diagram of illustrative PRBS generation circuitry that includes an XOR tree and an associated multiplexing circuit for supporting higher order PRBS generation and different parallel bit widths in accordance with an embodiment.

The implementation of FIG. 9 for PRBS-4 is fairly elegant. When the PRBS size is larger, however, the implementation is slightly more complex. FIG. 10 shows PRBS-31 generation circuitry 1000. As shown in FIG. 10, PRBS generation circuitry 1000 may include a $31^{st}$ order LFSR 1002 that outputs data bits d[30:0], an XOR tree 1004 capable of generating a 64-bit parallel output b[63:0], and a multiplexing circuit 1008. The 64-bits at the output of XOR tree 1004 may be fed to the output of circuitry 1000 via an optional bit reverse module 1006.

Because the size of the PRBS is so high, at least some of the data bits at the output of LFSR 1002 need to be fed forward to the inputs of multiplexer 1008. Referring still to FIG. 10, multiplexer 1008 may have a first input that receives bits b[30:0], a second input that receives bits b[54:24], a third input that receives bits b[62:32], a fourth input that receives bits b[63:44] that is combined with d[10:0], a fifth input that receives bits b[63:48] that is combined with d[14:0], a sixth input that receives bits b[63:54] that is combined with d[20:0], a control input that receives signal SEL, and an output on which bits from a selected one of its inputs can be routed. The output of multiplexer 1008 may be fed to the input of LFSR 1002 via feedback path 1010.

Configured in this way, circuitry 1000 may be operated in a PRBS-31 64-bit parallel output mode when SEL selects the first input for passing through to the multiplexer output, in a 40-bit parallel output mode when SEL selects the second input for passing through to the multiplexer output, in a 32-bit parallel output mode when SEL selects the third input for passing through to the multiplexer output, in a 20-bit parallel output mode when SEL selects the fourth input for passing through to the multiplexer output, in a 16-bit parallel output mode when SEL selects the fifth input for passing through to the multiplexer output, and in a 10-bit parallel output mode when SEL selects the sixth input for passing through to the multiplexer output, The $31^{st}$ order polynomial and the multi-width capability offered by circuitry 1000 of FIG. 10 is merely illustrative and do not serve to limit the scope of the present invention. If desired, multiplexing circuit 1008 associated with the single XOR tree 1004 may be configured to support any desired number of bus widths without the use of a gearbox. If desired, LFSR 1002 may be configured to support any PRBS size that is greater than 31 or less than 31.

The embodiments of FIGS. 9 and 10 both include a six-way multiplexing circuit. In general, multiplexers with more than two inputs can grow fairly quickly in complexity. In an effort to reduce the complexity of the multiplexing circuitry, the approach described in connection with FIGS. 5 and 6 (e.g., the use of one or more XOR trees with a gearbox) and the approach described in connection with FIGS. 8, 9, and 10 (e.g., the use of a single XOR tree with an output multiplexer and without a gearbox) can be combined to provide an embodiment having a simple gearbox and simple multiplexer.

Figure 11:
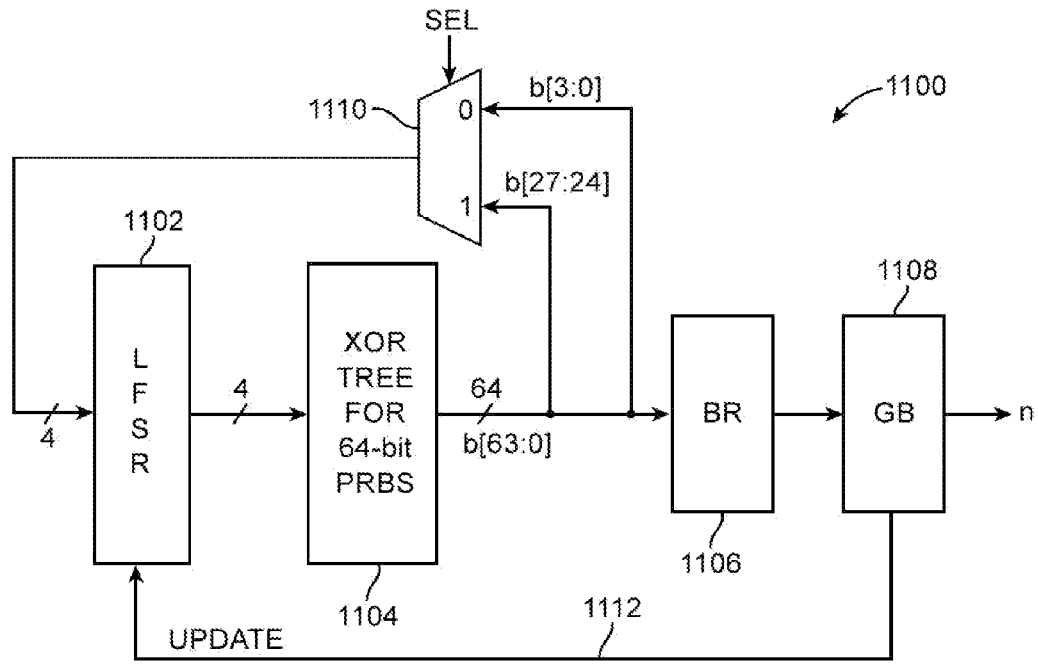
FIG. 11 is a diagram of illustrative PRBS generation circuitry that includes an XOR tree, an associated multiplexing circuit, and a gearbox for providing different parallel bit widths in accordance with an embodiment.

FIG. 11 shows PRBS generation circuitry 1100 that utilizes a single XOR tree in conjunction with a simple two-input multiplexer and a simple gearbox to support a variety of parallel bit widths. As shown in FIG. 11, PRBS generation circuitry 1100 includes a $4^{th}$ order linear feedback shift register 1102 (e.g., a register that implements a $4^{th}$ order polynomial), a single XOR tree 1104 that outputs 64-bits b[63:0] in parallel, a simple two-input multiplexing circuit 1110 for selectively routing a desired subset of b[63:0] back to register 1102 via a feedback path, and a simple gearbox circuit 1108 that receives the 64-bit output via an optional bit reverse module 1106 (i.e., a simple gearbox that performs data width conversion that is only a power of 2).

Multiplexer 1104 may have a first (0) input that receives a subset b[3:0] from the output of XOR tree 1104, a second (1) input that receives a different subset b[27:24] from the output of XOR tree 1104, a control input that receives control signal SEL, and an output on which bits from a selected one of the first and second multiplexer inputs are routed back to the input of register 1102.

Gearbox 1108 may be used to convert the 64-bit output to an n-bit output, where n can be equal to 8, 10, 16, 20, 32, 40, and 64 (as examples). To support n of 10, 20, and 40 (i.e., for n that are equal to factors of 40), signal SEL may be set to logic "1" so that bits b[27:24] are routed back to the input of LFSR 1102 while gearbox 1108 may be configured with a conversion factor of ¼, ½, and 1, respectively. To support n of 8, 16, 32, and 64 (i.e., for n that are equal to factors of 64), signal SEL may be set to logic "0" so that bits [3:0] are routed back to the input of LRSR 1102 while gearbox 1108 is configured to exhibit a conversion factor of ¼, ½, and 1, respectively. Similar to the previous examples that include a gearbox, register 1102 should only shift when gearbox 1108 feeds an asserted update signal to register 1102 via control path 1112.

Figure 12:
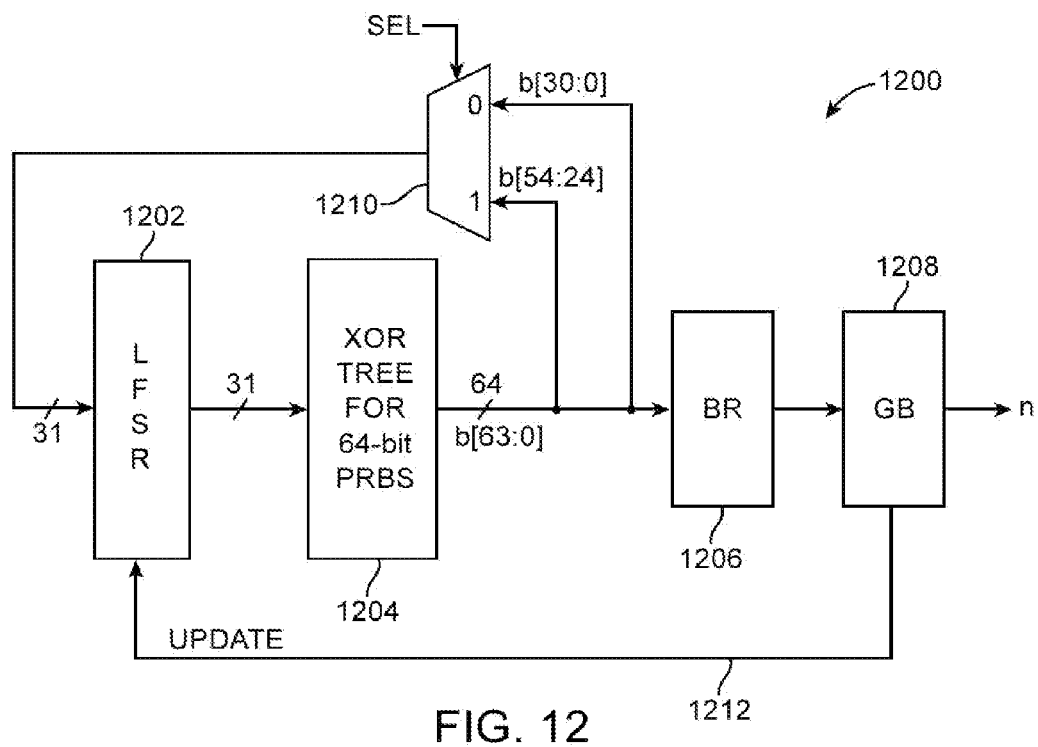
FIG. 12 is a diagram of illustrative PRBS generation circuitry that includes an XOR tree, an associated multiplexing circuit, and a gearbox for supporting higher order PRBS generation and different parallel bit widths in accordance with an embodiment.

FIG. 12 shows PRBS-31 generation circuitry 1200 includes a $31^{st}$ order linear feedback shift register 1202, a single XOR tree 1204 that outputs 64-bits b[63:0] in parallel, a simple two-input multiplexing circuit 1210 for selectively routing a desired subset of b[63:0] back to register 1202 via a feedback path, and a simple gearbox circuit 1208 that receives the 64-bit output via an optional bit reverse module 1206.

Multiplexer 1204 may have a first (0) input that receives a subset b[30:0] from the output of XOR tree 1204, a second (1) input that receives a different subset b[54:24] from the output of XOR tree 1204, a control input that receives control signal SEL, and an output on which bits from a selected one of the first and second multiplexer inputs are routed back to the input of register 1202.

Gearbox 1208 may be used to convert the 64-bit output to an n-bit output, where n can be equal to 8, 10, 16, 20, 32, 40, and 64 (as examples). To support n of 10, 20, and 40 (i.e., for n that are equal to factors of 40), signal SEL may be set to logic "1" so that bits b[54:24] are routed back to the input of LFSR 1202 while gearbox 1108 may be configured with a conversion factor of ¼, ½, and 1, respectively. To support n of 8, 16, 32, and 64 (i.e., for n that are equal to factors of 64), signal SEL may be set to logic "0" so that bits [30:0] are routed back to the input of LRSR 1202 while gearbox 1208 is configured to exhibit a conversion factor of ¼, ½, and 1, respectively. Similar to the previous examples that include a gearbox, register 1202 should only shift when gearbox 1208 feeds an asserted update signal to register 1202 via control path 1212.

The PRBS-4 and PRBS-31 generation circuitry of FIGS. 11 and 12 are merely illustrative and do not serve to limit the scope of the present invention. If desired, PRBS generation circuitry having a simple multiplexer (e.g., a multiplexer with only two inputs, a multiplexer with only four inputs, a multiplexers with only eight inputs, etc.) and a simple gearbox (e.g., a gearbox implemented to with a binary conversion factors) may be configured to support PRBS generation of any suitable order and to support parallel generation of any number of bits.

The embodiments thus far have been described with respect to integrated circuits. The methods and apparatuses described herein may be incorporated into any suitable circuit. For example, they may be incorporated into numerous types of devices such as programmable logic devices, application specific standard products (ASSPs), and application specific integrated circuits (ASICs). Examples of programmable logic devices include programmable arrays logic (PALs), programmable logic arrays (PLAs), field programmable logic arrays (FPLAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

The programmable logic device described in one or more embodiments herein may be part of a data processing system that includes one or more of the following components: a processor; memory; IO circuitry; and peripheral devices. The data processing can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the family of devices owned by ALTERA Corporation.

Although the methods of operations were described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

The foregoing is merely illustrative of the principles of this invention and various modifications can be made by those skilled in the art without departing from the scope and spirit of the invention. The foregoing embodiments may be implemented individually or in any combination.

What is claimed is:

1. Pseudo random bit sequence (PRBS) generation circuitry, comprising:
   a linear feedback shift register;
   a tree circuit having a plurality of logic gates that is coupled to the linear feedback shift register and is configured to output a pseudo random bit sequence in parallel; and
   control circuitry that is coupled to the linear feedback shift register and the tree circuit and that enables the PRBS generation circuitry to output a first portion of the pseudo random bit sequence having a first bit width in a first mode and to output a second portion of the pseudo random bit sequence having a second bit width that is different than the first bit width in a second mode, wherein the control circuitry comprises:
      a multiplexing circuit having a first input that receives a third portion of the pseudo random bit sequence from the tree circuit, a second input that receives a fourth portion of the pseudo random bit sequence from the tree circuit, and an output that is coupled to the linear feedback shift register via a feedback path, wherein the third portion of the pseudo random bit sequence is different than the fourth portion of the pseudo random bit sequence.

2. The PRBS generation circuitry defined in claim 1, wherein the tree circuit comprises a plurality of logic exclusive OR gates.

3. The PRBS generation circuitry defined in claim 1, wherein the control circuitry further comprises:
   an adjustable bus width conversion circuit that receives the pseudo random bit sequence from the tree circuit and that provides an update signal to enable shifting at the linear feedback shift register.

4. The PRBS generation circuitry defined in claim 3, wherein the tree circuit comprises:
   a first tree sub-circuit that outputs the third portion of the pseudo random bit sequence; and
   a second tree sub-circuit that outputs the fourth portion of the pseudo random bit sequence.

5. The PRBS generation circuitry defined in claim 4, wherein the control circuitry further comprises:
   an additional multiplexer having a first input that receives the third portion of the pseudo random bit sequence from the first tree sub-circuit, a second input that receives the fourth portion of the pseudo random bit sequence from the second tree sub-circuit, and an output that is coupled to the adjustable bus width conversion circuit.

6. The PRBS generation circuitry defined in claim 1, wherein the tree circuit comprises the only tree of logic exclusive OR gates in the PRBS generation circuitry.

7. Pseudo random bit sequence (PRBS) generation circuitry, comprising:
   a linear feedback shift register;
   a plurality of logic gates that receives signals from the linear feedback shift register and that outputs a parallel data word;
   a multiplexing circuit having a first input that receives a first subset of the parallel data word, a second input that receives a second subset of the parallel data word, and a multiplexer output that is coupled to the linear feedback shift register; and
   an external output that receives the parallel data word from the plurality of logic gates.

8. The circuitry defined in claim 7, wherein the first subset is different than the second subset.

9. The circuitry defined in claim 7, wherein the plurality of logic gates comprises a plurality of logic exclusive OR gates.

10. The circuitry defined in claim 7, further comprising:
    a gearbox circuit that receives the parallel data word from the plurality of logic gates and that outputs an update signal that enables shifting at the linear feedback shift register.

11. The circuitry defined in claim 10, wherein the gearbox circuit is configured to provide only binary bus width conversion.

12. The circuitry defined in claim 10, further comprising:
    a bit reverse module interposed between the plurality of logic gates and the gearbox circuit.

13. Pseudo random bit sequence (PRBS) generation circuitry, comprising:
    a linear feedback shift register;
    an exclusive OR (XOR) tree circuit that is coupled to the linear feedback shift register and that generates parallel data bits; and
    an adjustable data width conversion circuit that receives the parallel data bits from the XOR tree circuit and that outputs an control signal for selectively enabling shifting at the linear feedback shift register.

14. The circuitry defined in claim 13, further comprising:
    a bit reverse module interposed between the XOR tree circuit and the adjustable data width conversion circuit.

15. The circuitry defined in claim 13, wherein the adjustable data width conversion circuit is configured to output a first number of parallel data bits in a first mode and to output a second number of parallel data bits that is different than the first number in a second mode.

16. The circuitry defined in claim 13, further comprising:
    an additional XOR tree circuit coupled to the linear feedback shift register; and
    a multiplexing circuit having a first input that is coupled to the XOR tree circuit, a second input that is coupled to the additional XOR tree circuit, and an output that is coupled to the adjustable data width conversion circuit.

17. The circuitry defined in claim 16, further comprising:
    a bit padding circuit interposed between the additional XOR tree circuit and the multiplexing circuit.

18. The circuitry defined in claim 16, further comprising:
    an additional multiplexing circuit having a first input that receives a subset of bits from the XOR tree circuit, a second input that receives a subset of bits from the additional XOR tree circuit, and an output that is coupled to the linear feedback shift register.

* * * * *